Aug. 16, 1927.
W. A. VAN BRUNT
1,639,317
SEED DISPENSING MECHANISM
Original Filed June 10, 1918
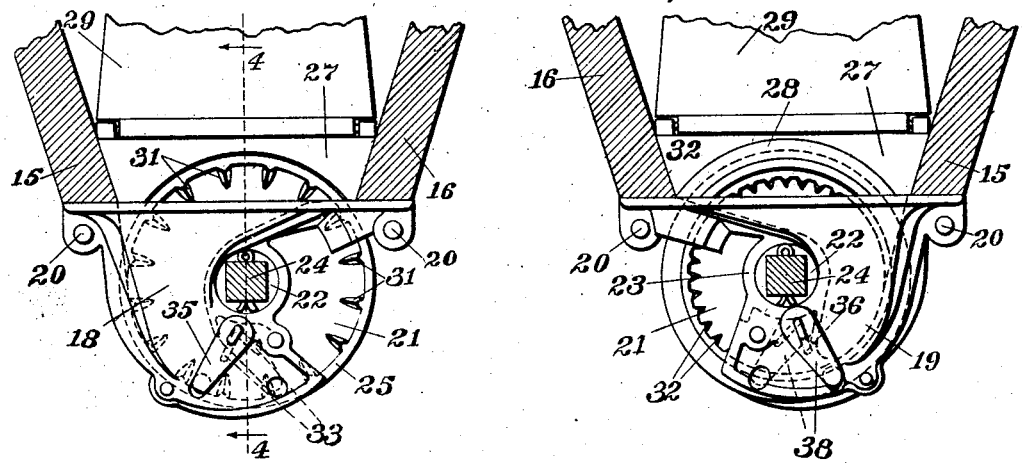
Fig. 1.   Fig. 2.
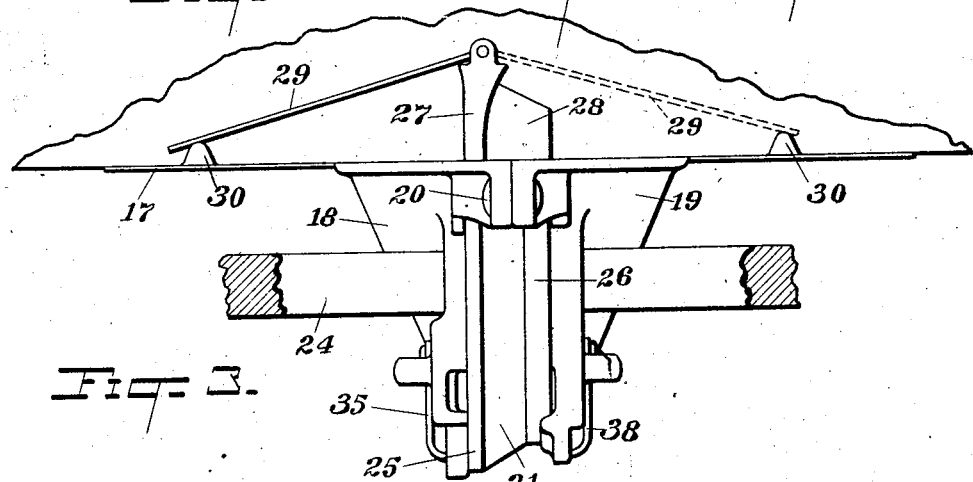
Fig. 3.
Fig. 4.
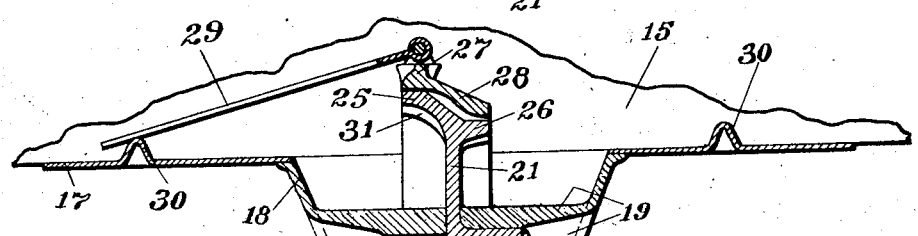
Witness:
Erich J. Erickson.
Inventor:
Willard A. Van Brunt
by Adams & Jackson
Attorneys Patented Aug. 16, 1927.

1,639,317

UNITED STATES PATENT OFFICE.

WILLARD A. VAN BRUNT, OF LOS ANGELES, CALIFORNIA, ASSIGNOR TO VAN BRUNT MANUFACTURING COMPANY, OF HORICON, WISCONSIN, A CORPORATION OF WISCONSIN.

SEED-DISPENSING MECHANISM.

Original application filed June 10, 1918, Serial No. 239,109. Divided and this application filed September 4, 1920. Serial No. 408,212.

This application is filed as a division of my application Serial No. 239,109, for improvements in seeding machines, filed June 10, 1918.

This invention relates to seed dispensing mechanisms of the type used for planting cereal crops such as wheat, rye, barley, oats, in which the individual kernels are carried by a sloping flange which is given a rotary movement for causing the kernels to drop one by one for delivery to the soil. The object of my invention is to provide an improved apparatus so constructed that it may easily be adapted either for dispensing small seeds, like alfalfa, or larger seeds, such as beans. The preferred construction by which I have accomplished this object is illustrated in the drawings and is hereinafter specifically described. That which I believe to be new and desire to protect by Letters Patent is set forth in the claims.

In the drawings,—

Fig. 1 is a cross section through a seed hopper and including a side view of one of my improved seed dispensing mechanisms;

Fig. 2 is a view of the seed dispensing mechanism of Fig. 1 as seen from the opposite side;

Fig. 3 is a rear elevation of the parts shown in Fig. 1; and

Fig. 4 is a central vertical section taken on line 4—4 of Fig. 1.

Referring to the drawings, 15, 16 indicate the side plates and 17 the bottom plate of a seed hopper which extends transversely of the seeding machine, the bottom being provided, as usual, with any desired number of discharge openings with each of which one of my improved dispensing apparatuses may be associated. As these are all alike, only one of them is illustrated. Extending downward from each discharge opening in the bottom plate 17 are two complementary housing members 18, 19 which are secured in fixed relation to each other and to the hopper by bolts 20, shown in Figs. 1 and 2, and between these housing members, the walls of which converge downwardly, is mounted a feed wheel 21 that cooperates with said members respectively to form two separate seed passages, the disc-like intermediate portion or web of said feed wheel constituting a partition between said passages. The feed wheel is adapted to rotate between the members 18, 19, and to this end it is provided with a hub 22 journaled in a bearing 23 provided in the member 19, as shown in Fig. 4. The wheel 21 is rotated by means of a shaft 24 which is preferably square in cross-section and passes through a square hole in said wheel, as shown in Figs. 1 and 3. In the illustration of Fig. 1 the feed wheel is designed to rotate in a counter-clockwise direction, and as there shown the housing members extend from the bottom plate 17 down around the left hand or front side of said shaft, leaving the lower and rear portion of the feed wheel exposed. The seed is therefore discharged toward the rear.

As best shown at the bottom of Fig. 4, the feed wheel 21 is provided at its periphery with outwardly extending flanges 25, 26 at opposite sides thereof, which flanges cooperate with the lower portions of the members 18, 19 to form the passages through which the seed is delivered, and serve also to carry the seed down through the passages to the point of delivery thereof. For controlling the admission of seed from the hopper alternately to either passage, I provide a fixed plate or partition 27 which extends transversely of the lower portion of the hopper over the flange 25, thereby forming two compartments that communicate respectively with the two seed passages, and at one side said partition is provided with a conical hood 28 which overlies the upper portion of the feed wheel, as shown in Fig. 4. Hinged to the upper marginal portion of said partition is a plate or shield 29, which may be swung to one side or the other thereof so as to overlie the entrance to the corresponding passage and thereby cut off the admission of seed thereto while leaving the other passage open. Thus either passage, and that side of the feed wheel which operates therein, may be used alone. As clearly shown in Fig. 4, the bottom plate 17 is provided with transversely disposed upwardly projecting ribs 30 that serve as supports for the outer end of the plate 29, thereby ensuring a better closure since a line contact with the plate 29 is provided for, and, more-over, the ribs aid in preventing seed from passing under the plate 29 to the outlet from the hopper, which would be apt to occur if the outer edge of the plate 29 rested directly on the hopper bottom, owing to unevenness in the surface of said bottom.

As shown in Fig. 4, the flange 26 is smaller than the flange 25, both as to diameter and the extent to which it projects laterally, and both of these flanges are provided at intervals with inwardly extending ribs 31, 32 respectively, the ribs 32 being of smaller size and more numerous than the ribs 31, so that they are spaced a considerably smaller distance apart than the ribs 31, as shown in Fig. 2. The purpose of this variation is to adapt the opposite sides of the feed wheel for handling different kinds of seeds. As shown in Fig. 4, the seed passage at each side of the feed wheel 21 narrows toward its lower end and turns so as to be directed toward the rear, this effect being attained by the cooperation of the members 18, 19 and the flanges 25, 26, so that the capacity of one of said passages is much less than that of the other. As will be readily understood, when the feed wheel 21 is rotated in a counter-clockwise direction as viewed in Fig. 1, and with the plate 29 closing the entrance to one of the seed passages, the seed will fill the opposite passage and be fed along through it by the ribs 31 and 32, as the case may be, until it is discharged through the outlet at that side of the feed wheel.

For varying the effective size of the lower or discharge portion of each of the seed passages, I provide a valve at each side of the feed wheel by which the effective area of the discharge opening at that side of the wheel may be varied. One of these valves comprises a gate 33 pivotally mounted on the member 18 by means of a pin 34 provided with a spring handle or arm 35 at its outer end by which it may be rocked to turn the gate 33 with respect to the member 18 to vary the effective area of the passage therethrough. As clearly shown in Fig. 4, the outer end of this arm bears against the housing member and serves to hold the gate in its different positions of adjustment. When the handle 35 is swung toward the left to the position shown in Fig. 1, the gate 33 will be operative to reduce the size of said passage so that the minimum discharge will occur, but by swinging said gate to the limit of its movement toward the right, as indicated by dotted lines in that figure, it will be out of operative position and the effective area of the discharge opening will not be materially decreased.

Similar valve mechanism is provided at the opposite side of the feed wheel, comprising a gate 36 mounted upon the member 19 by means of a pin 37 and adapted to be swung for adjustment by means of a spring arm 38 carried by the outer end of the pin 37. The operation of the gate 36 is the same as that above described in connection with the gate 33.

The passage shown at the right-hand side in Fig. 4 is the one adapted for use for planting small seed such as alfalfa, clover and wheat, the flange 26 being comparatively narrow and the space between the ribs 32 being comparatively small. As the feed wheel 21 rotates in clockwise direction as viewed in Fig. 2, the kernels are carried around toward the left by the flange 26, and after passing out of the passage will drop singly from the flange, the angular disposition and the proportions of the parts being such that the kernels normally fall off one at a time rather than in a mass. When coarser and heavier seed is to be planted the left-hand passage as seen in Fig. 4 is used. By reason of the greater width of the flange 25 and the greater distance between the ribs 31, this flange is appropriate for planting seed such as peas or beans. As will be appreciated by a comparison of Figures 1 and 2, the housing member 19 at the small diameter side of the feed wheel extends laterally a shorter distance across the wheel to a point of intersection with the feed ring, and has an end surface of steeper pitch than the end surface of the housing member 18 at the large diameter side of said wheel. The seed passage at the larger diameter side of the wheel is longer than that at the smaller diameter side thereof, owing to the greater diameter of the feed wheel at that side and the fact that said end surfaces intersect the flanges across which they extend, at points lying substantially in the same radial plane. By this construction seed is delivered from either side of the wheel with great accuracy notwithstanding the different sizes of the seed.

In the construction shown, the spring arms or levers 35 and 38 are adapted to engage suitable notches provided in the members 18 and 19, respectively, for holding the gates 33 and 36 in the desired adjusted position.

So far as I am aware, I am the first in the art to provide a feed-wheel comprising a plurality of feed-rings or flanges of different diameters adapted for alternative use to deliver seed through separate passages from a hopper communicating therewith whereby a single complete structure is enabled to operate effectively on widely-different kernels, and my claims are to be construed accordingly. While I prefer to employ ribs on the inner faces of the tapered flanges or feed-rings for carrying the seed about thereon, it will be understood that I do not wish to limit myself to this form of seed-engaging shoulders except as hereinafter specifically claimed.

What I claim as my invention and desire to secure by Letters Patent is,—

1. A seed dispensing mechanism comprising a hopper having an opening in the bottom thereof, two seed delivery passages communicating with said opening, a transverse partition in said hopper between said passages, transversely-disposed ribs rising from and extending across the bottom of the hopper at opposite sides of said partition, and a plate pivotally mounted on said partition and adapted to be turned down so that its outer portion will lie closely upon the upper edge of the rib at either side of the partition to cut off the admission of seed to the corresponding passage.

2. A seed dispensing mechanism comprising a feed-wheel, two tapered feed-rings of different inside diameters on opposite sides of said wheel, and housing members cooperating with said wheel and said feed-rings for forming seed passages at opposite sides of the wheel leading partially across the lower portion of the wheel, the housing member associated with the feed-ring of smaller diameter being extended laterally a shorter distance across the wheel to a point of intersection with the feed-ring, and having an end surface of steeper pitch than the housing member at the opposite side.

3. A seed-dispensing mechanism comprising a feed-wheel, a flange on one face of said wheel, inwardly-extending ribs spaced apart on the inner face of said flange, a second flange of smaller diameter on the opposite face of said wheel, inwardly-extending ribs spaced a shorter distance apart on the inner face of said second flange, and housing members associated with said wheel and said flanges for forming seed passages leading partially across the lower portion of the wheel at opposite sides thereof, the housing member associated with the flange of smaller diameter being extended laterally a shorter distance across the wheel to a point of intersection with said flange, and having an end surface of steeper pitch than the housing member associated with the flange of greater diameter.

WILLARD A. VAN BRUNT.